(12) United States Patent
Wallace, Jr. et al.

(10) Patent No.: US 8,027,671 B2
(45) Date of Patent: Sep. 27, 2011

(54) DELIVERING FILES TO A MOBILE DEVICE

(75) Inventors: Gary N. Wallace, Jr., Butler, PA (US); Adam L. Berger, Pittsburgh, PA (US)

(73) Assignee: Penthera Partners, Inc., Pittsburgh, PA (US)

( * ) Notice: Subject to any disclaimer, the term of this patent is extended or adjusted under 35 U.S.C. 154(b) by 848 days.

(21) Appl. No.: 12/013,567

(22) Filed: Jan. 14, 2008

(65) Prior Publication Data
US 2009/0181655 A1 Jul. 16, 2009

(51) Int. Cl.
*H04M 3/00* (2006.01)

(52) U.S. Cl. .................. 455/420; 455/450; 370/338

(58) Field of Classification Search .................. 455/450; 370/338
See application file for complete search history.

(56) References Cited

U.S. PATENT DOCUMENTS

| | | | |
|---|---|---|---|
| 5,625,818 A | 4/1997 | Zammer et al. | |
| 2002/0111912 A1* | 8/2002 | Hunter et al. | 705/52 |
| 2003/0023745 A1 | 1/2003 | Noe | |
| 2003/0145098 A1* | 7/2003 | Litwin | 709/232 |
| 2003/0212992 A1 | 11/2003 | Ronning et al. | |
| 2003/0224799 A1* | 12/2003 | Squibbs et al. | 455/450 |
| 2004/0123323 A1 | 6/2004 | Russo | |
| 2004/0143652 A1* | 7/2004 | Grannan et al. | 709/223 |
| 2004/0148344 A1 | 7/2004 | Navar et al. | |
| 2005/0076214 A1* | 4/2005 | Thomas et al. | 713/170 |
| 2005/0246564 A1 | 11/2005 | Bhesania et al. | |
| 2006/0031537 A1 | 2/2006 | Boutboul et al. | |
| 2007/0145098 A1* | 6/2007 | Lee et al. | 228/101 |
| 2007/0211674 A1* | 9/2007 | Ragnar et al. | 370/338 |
| 2008/0078871 A1 | 4/2008 | Munson et al. | |
| 2008/0120369 A1 | 5/2008 | Gustavsson | |
| 2008/0183839 A1 | 7/2008 | Shuqair et al. | |
| 2009/0037559 A1* | 2/2009 | Ran | 709/219 |
| 2009/0125570 A1 | 5/2009 | Bailey et al. | |

FOREIGN PATENT DOCUMENTS

WO  WO 2011/008199  1/2001

OTHER PUBLICATIONS

PCT/US09/50568, PCT International Search Report and Written Opinion, Sep. 1, 2009, 9 pp.
The Apache Software Foundation, "Apache: HTTP Server Project", http://httpd.apache.org, retrieved from Internet website, printed on Feb. 10, 2011, copyright 2011 (2 pages).

* cited by examiner

*Primary Examiner* — Nick Corsaro
*Assistant Examiner* — Isaak R Jama
(74) *Attorney, Agent, or Firm* — Fish & Richardson P.C.

(57) ABSTRACT

Among other things, in controlling a download of one or more files from a server to a mobile device, account is taken of at least two of: an urgency of the file, the existence of a user-indicated preference about the download, a power status of the mobile device, and a network connectivity status of the mobile device.

17 Claims, 7 Drawing Sheets

DELIVERING FILES TO A MOBILE DEVICE

BACKGROUND

This description relates to delivering files to a mobile device.

Figure 1:
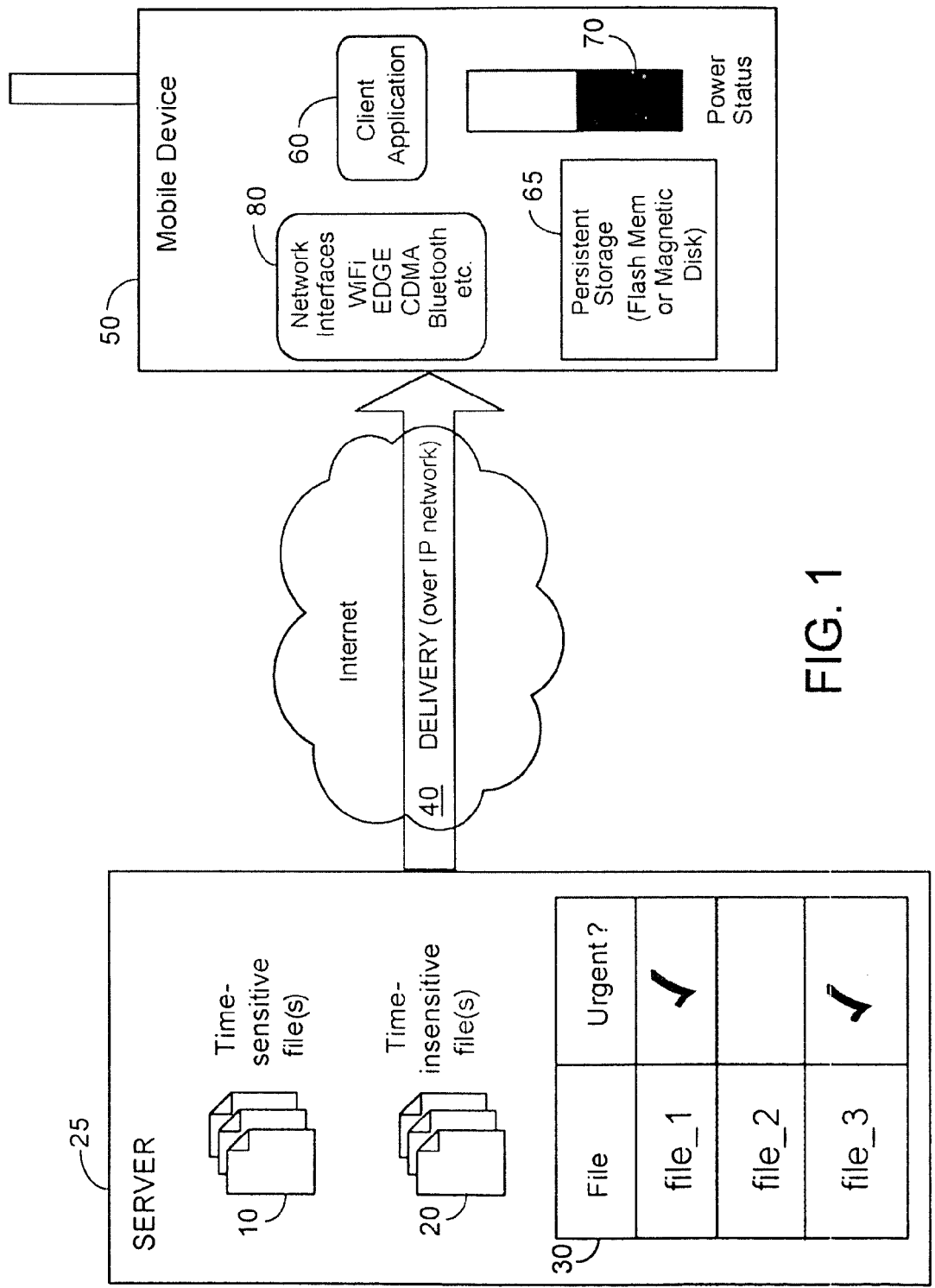

As shown in FIG. 1, consider a client application 60 that delivers files from a remote server 25 to a mobile device 50. From time to time, files 10, 20 are created on the remote server. Shortly after they are created on the remote server, these files need to be delivered to the mobile device, where they are stored on the device's persistent storage 65.

In the email service provided on a RIM Blackberry device, for example, once the software on the mobile device is set up, email messages automatically arrive when they are available, with no user action required.

SUMMARY

In general, in an aspect, in controlling a download of one or more files from a server to a mobile device, account is taken of at least two of: a power status of the mobile device, a network connectivity status of the mobile device, an urgency of the file, and the existence of a user-indicated preference about the download.

Some implementations include one or more of the following features. The controlling includes suspending a download of a file that is occurring when a power level or network connectivity degrades during the download. The suspending of the download is based on a set of rules or heuristics. The suspended download is resumed when the power level or network connectivity improves during the suspension. The resumed download does not include at least some of the file or files that were downloaded before the suspension. The resumed download does not include one or more pieces of a file that were downloaded before the suspension.

In general, in an aspect, download of a file from a server to a mobile device through a network is controlled by breaking the file into pieces to be sent separately, monitoring conditions of the mobile device and the network with respect to each piece, considering suspending download of a subsequent piece if the conditions deteriorate with respect to a piece.

Some implementations include one or more of the following features. The conditions are monitored after each piece is sent and before download of the subsequent piece has begun. A partial download of a file is allowed to continue under deteriorated conditions, if predetermined circumstances exist.

In general, in an aspect, a user of a mobile device, to which large files are normally downloaded automatically from a server based on the user's preferences, can initiate a download by invoking a 'sync now' option on a user interface of the mobile device.

In general, in an aspect, at a mobile device, a sync signal is received from a server with respect to one or more large files to be downloaded, and to the sync signal is responded to by requesting and accepting a download of the one or more large files.

In general, in an aspect, at a mobile device, an indication is displayed to a user of the time when a download of one or more large files to the mobile device is expected to occur.

In general, in an aspect, an amount of bandwidth used to download one or more large files to a mobile device is adjusted based on a time of day when the download is to occur.

Some implementations include one or more of the following features. The amount of bandwidth used at a given time of the day is governed by an amount paid by a user of the mobile device.

In general, in an aspect, a log of download activity, with respect to one or more large files that are downloaded to the mobile device, is sent from a mobile device to a server.

In general, in an aspect, a user of a mobile device can specify one or more types of files that are to be downloaded to the mobile device, and the specification of file types is stored in a server in association with an identification of the mobile device or the user.

In general, in an aspect, at a server, one or more files are selected to be downloaded to a mobile device based on stored preferences of a user of the mobile device and stored information about files that were previously downloaded to the user's device.

In general, in an aspect, a list of files that are in process of being transmitted to a client mobile device, but which have not yet been completely transmitted to the device, is displayed to a user of the device Implementations may include one or more of the following features. The displaying includes showing a percentage of at least one of the listed files which has been transmitted. The displaying can occur at the mobile device. The displaying can occur on a web page.

These and other features and aspects, and combinations may also be expressed as methods, apparatus, systems, program products, databases, means for performing functions, and in other ways.

Other advantages and features will become apparent from the following description and from the claims.

DESCRIPTION

Figure 2:
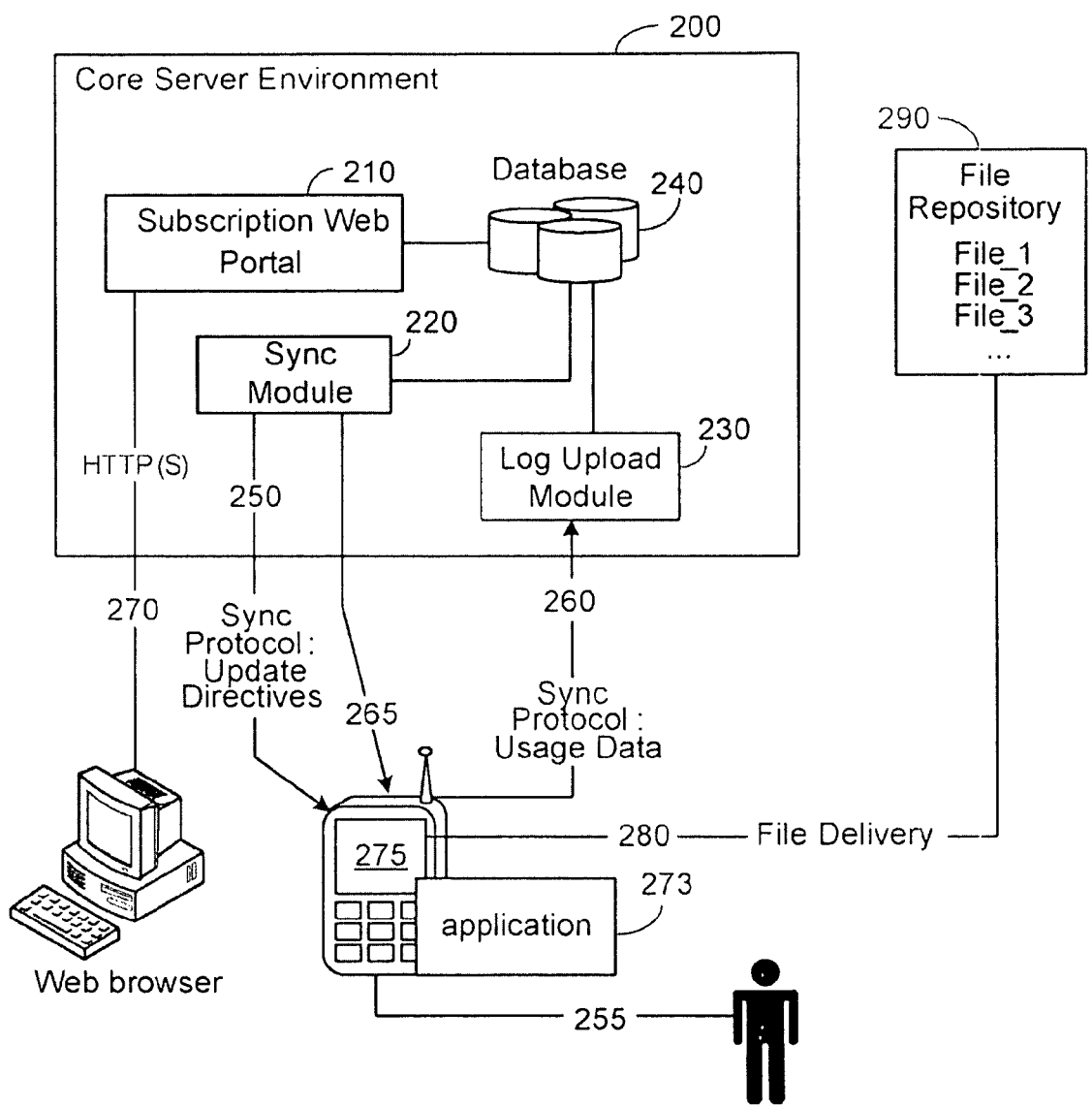
Figure 3:
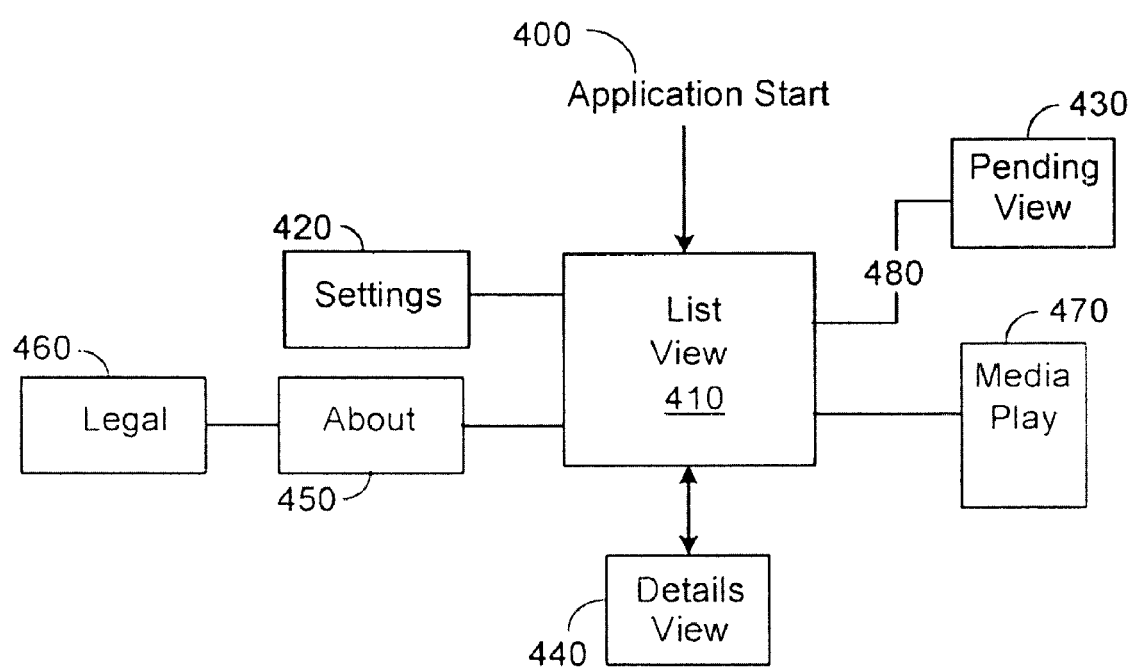
Figure 4:
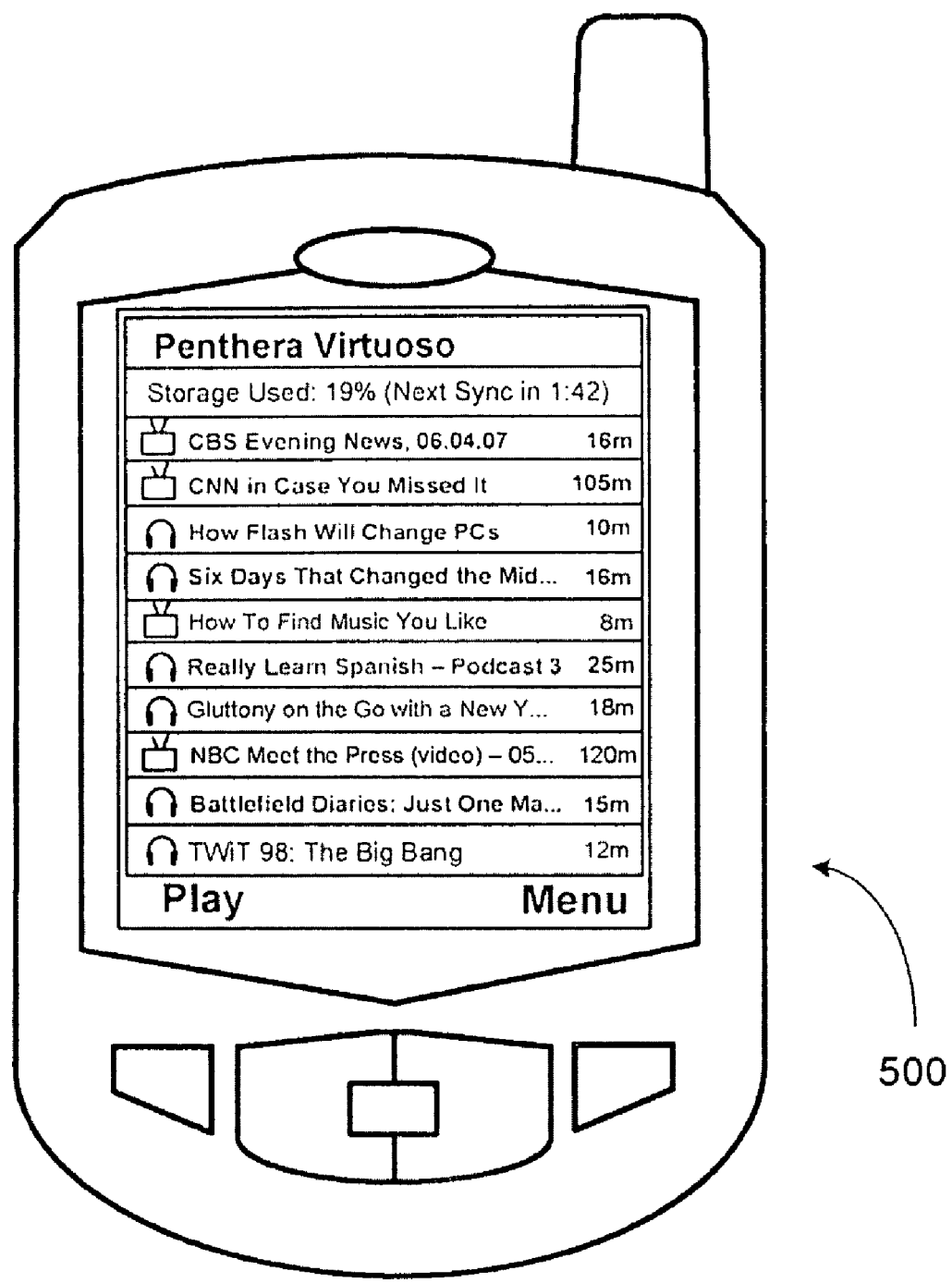
Figure 5:
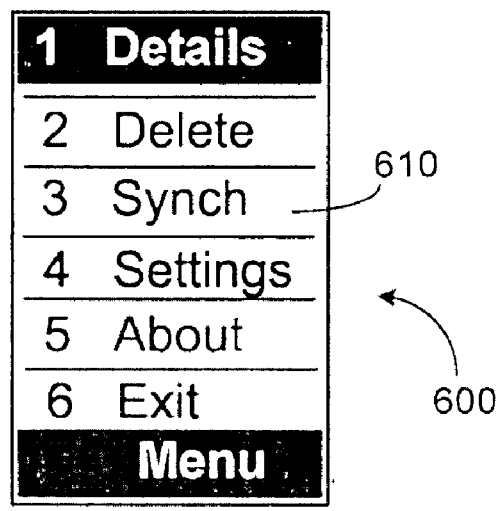
Figure 6:
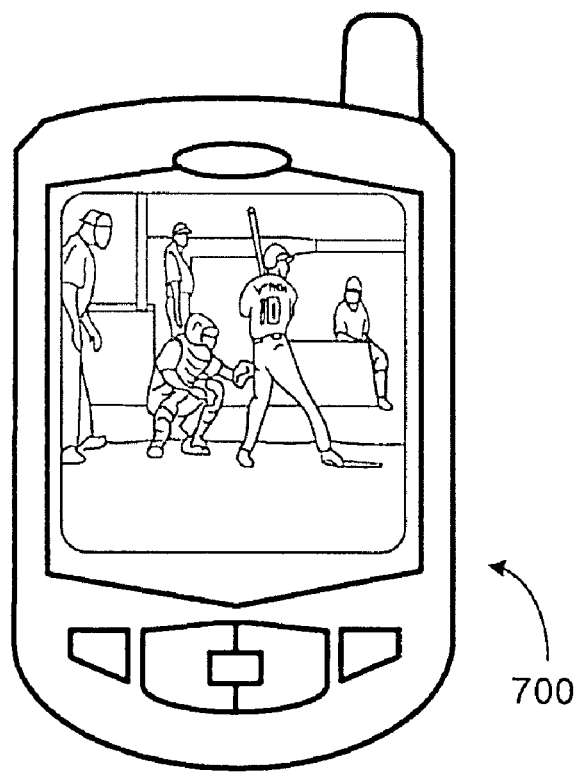
Figure 7:
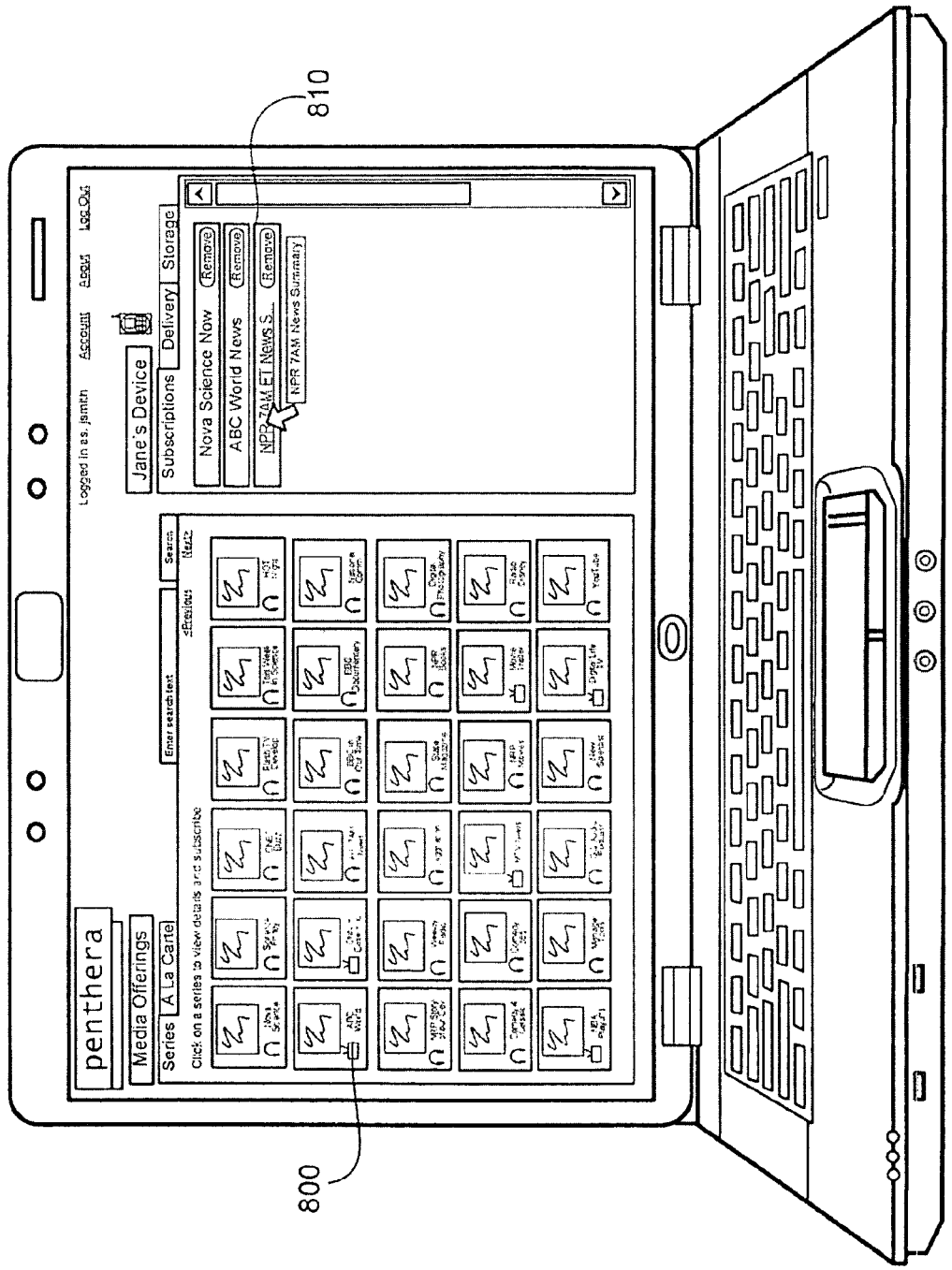
Figure 8:
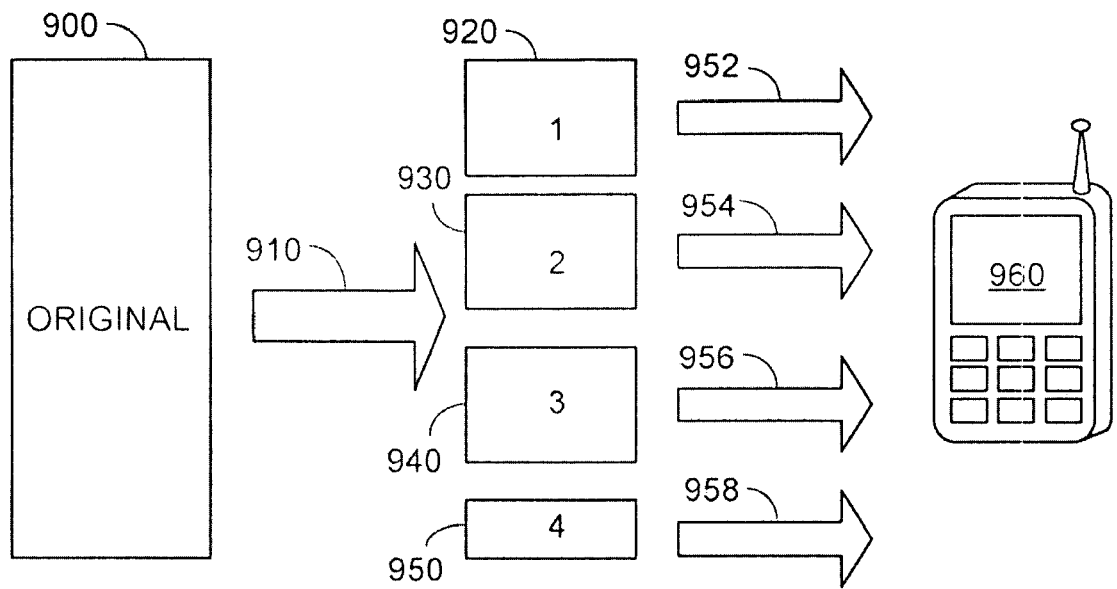

FIGS. 1 and 2 are block diagrams of a system architecture including a server and a client.
FIG. 3 is a user-flow diagram of a client application.
FIG. 4 is a screen shot of a user application.
FIG. 5 is a menu of the application.
FIG. 6 is a screen shot of a video file.
FIG. 7 is a screen shot of a web-based subscription portal.
FIG. 8 is a block diagram.

Some of the files 10, 20 in FIG. 1 are large. For example, a 30-minute audio, a 10+ minute video file, and a collection of 100+ web pages may be from 1 MB to 500 MB or larger.

In the technique described here, the user of the mobile device never needs to take any explicit action to query for new files on the server, nor to fetch the files from the server. Delivery 40 of the new files (for example, over an IP network) can occur automatically and without explicit user action or knowledge. There is no need, for example, to press any key on the mobile device or to attach a cable to the device to cause the file delivery to occur.

In contrast, typical files delivered to mobile devices today, such as email messages, audio files, and individual web pages, are typically in the 10 KB to 200 KB range each.

Delivering a file that is tens or hundreds of megabytes to a mobile device presents challenges that are absent in delivering smaller files. With large files, a complete download may take tens of minutes or even hours, depending on the speed of the connection. During this time, conditions may change. For example, at the start of the download, the mobile device may be within an area with excellent wireless network coverage; but as the download progresses, the network conditions may degrade.

Also, as the download progresses, the device's battery may lose its charge to a level at which continuing the file downloading risks depleting the battery. Generally speaking, small-file applications (music downloads, email, web browser) are not and need not be sensitive to these issues. In other words, downloading a file that is large may entail a time delay that implicates one or more other factors in the strategy used to determine the manner and timing of the download.

In the technique described here, an application 60 manages the delivery of these large files from the remote server to the mobile device in a way that is sensitive to the following considerations:

Network. The mobile device has one or more network interfaces 80, e.g., GPRS/EDGE, CDMA/EVDO, WiFi, Bluetooth, or USB cable tethered to a host computer, each of which can take advantage of a network resource for connecting to the Internet 40 (or other communication network). This connection is the "last hop" for data traveling over the IP network from the server to the device. The availability of one or more of these network resources will vary from time to time as, for example, the mobile device moves in and out of network "hotspots." For example, at one moment, WiFi and EDGE may be available; a few minutes later, only EDGE may be available.

Power. The mobile device's power status 70 varies from time to time, depending, for example, on whether the device is charging or how long it has been on battery.

Timeliness. Certain files 10 are time sensitive and may need to be delivered right away (e.g., a stock ticker update). Other files 20 are relatively time insensitive, and a delay of hours in delivery may be acceptable (e.g., a movie trailer). Each file stored on the remote server may be annotated with an "urgency" parameter 30, which may be assigned by a creator of the file (content) or determined based on some other policy.

These considerations are sometimes interrelated. For example, a mobile device attempting to receive data over a poor-quality network connection can cause a significant drain on its battery.

We shall denote by "sync'ing" the process of copying a file from the remote server to the mobile device.

We describe a method for sync'ing that is sensitive to the above considerations. The method takes into account a set of factors (two or more) in determining a sync'ing policy, by which we mean whether and how often to sync. In some implementations, there is a particular algorithm used to take into account these factors to implement a sync'ing policy.

As shown in FIG. 2, an example of the technique described here includes three parts: a client, a server, and a file repository. The client is a software application 273 that resides on the mobile device 275. The server 200 is comprised of a set of software components including a web portal 210, a sync module 220, a log upload module 230, and a database 240. The file repository 290 includes a file system storing files for subsequent delivery to devices, and an application that manages the delivery of those files over an IP network (an example of such an application is the Apache HTTP server—http://httpd.apache.org/).

The client may be installed by the device manufacturer (OEM) before delivery to the retail outlet which sells or delivers the device (we sometimes refer to the mobile device simply as a device) to the end-user. Alternatively, the client may be installed by the end-user after he has acquired the device, by downloading the software application from the Internet.

In some implementations, the client behaves as follows:
Wait for a signal to indicate that sync'ing should occur. The signal may come from the device itself, from the server 265, or from the end-user 255.
Select an available IP channel (GPRS, WiFi, HSDPA, USB port) for the sync'ing.
Connect to the sync module 220 on the server and transmit a query (that conforms to a defined sync'ing protocol) for new files 250.
Download new files 280 from a file repository 290 and treat old files as expired.
Optionally, report (in conformity with the sync'ing protocol) behavior and usage 260 back to the server The application performs these steps transparently to the user. That is, the user need not take any action to cause the steps to be performed and the user need not be made aware of any of the steps occurring. New files are delivered—hourly, daily, weekly—directly to the mobile device. No user action is required. This is similar to the behavior of a home Digital Video Recorder (DVR).

Once the files have been downloaded, they can be stored on the device's file system. For example, on a Windows Mobile device, the files could be stored in the "My Documents" folder. The user can access them manually, using existing tools on the mobile device (e.g., a "File Manager" application on a Windows Mobile device).

However, because user-access to a device file system is not always available (e.g., on many Java-based phones) and because even when such access is available it is not always intuitive, the client may include an application (FIGS. 3, 4) that provides a user-friendly access to a list of downloaded and currently-available files. The application 400 may enable the user to view information about the available files (410 and 500. As shown in FIG. 5, the application display a menu 600 containing an option 610 to manually force a sync'ing with the server. The application may also allow the user to view files that are scheduled for delivery and/or in transit 430, but not yet fully downloaded. The application may also allow for users to change some aspects of the behavior of the client application 420, and show some details about the version and copyright information of the application 450.

The delivered files may be of various types. For example, web pages (e.g., HTML), audio files (e.g., MP3), video files (e.g., h.264 or WMv9 or Flash), and so on. The application need not itself provide rendering/playout/presentation for any or all of these file types. Instead, the application may interface with existing applications (web browser, media player, etc.) on the device through standard application programming interface (API) calls. Once the user selects a file from the list (or from the native file browser), the appropriate external application is launched to render the file (FIG. 6, 700).

The server's behavior need not be a synchronous step-by-step process, but rather can be a set of tasks that occur asynchronously, as the server is contacted by various mobile devices 275 and web-based terminals 285. The server's behavior in some implementations includes the following (with reference again to FIG. 2):

When contacted by a web browser 285 through an HTTP connection 270, serve up web pages from a portal 210 that allows end-users to personalize their subscriptions including specifying the kinds of files they wish to receive (e.g., news updates, movie trailers, weather reports, etc.). A representative screen shot of the subscription portal is shown in FIG. 7. The portal may provide 800 a menu of subscriptions or "channels" available for selection. The web portal may show 810 the current subscription policy of the user, e.g., which channels the user has requested to be delivered to his device.

The portal may allow the user to edit this subscription policy.

Retain persistent data in a database 240. Among the information in this database are (a) the subscription policy for each user, and (b) usage information uploaded from every client device 275.

Deliver download instructions 265 to a client 275 upon request. These instructions direct the client to a file repository 290 (which may be separately located and controlled) where the files are stored and from which they are served over an IP connection 280.

Receive uploaded usage data from each mobile device 275 in a module 230 and store it in the database 240.

When a mobile device 275 queries the sync module 220 about the presence of new files, the sync module performs a multi-step process to determine if any such files are present. In some implementations, that process includes the following:

Check the user's subscription policy in the database 240, i.e., discover which kinds of files the user has previously (through the web portal 210) requested.

Check the database 240 to discover which file(s) were most recently delivered to the user.

Check the file repository 290 to see which files have appeared subsequent to the files most recently delivered to the user.

Deliver over an IP connection 265 to the mobile device 275 a manifest of pointers to the newly-arrived files residing on the file repository 290.

Sync Protocol

In some implementations, the sync'ing protocol includes the following features.

Account for Current Conditions

| Condition | Example | Sync? |
| --- | --- | --- |
| Impossible to sync | No network access | No |
| Expensive to sync | Poor network access (sync'ing would consume a lot of battery charge) | No |
| Inexpensive to sync | High speed connection (e.g., WiFi) is available | Yes |
| Scarce resources | Battery charge is below a certain threshold | No |
| Abundant resources | Device is charging or battery is full charged | Yes |
| User wants or needs the file(s) | 1. File priority is high, or 2. User explicitly requests a sync | Yes |

Monitor Device Conditions During Sync'ing

Instead of performing only a one-time check (to decide whether to sync or not) prior to a download and then downloading one or more files, the protocol also checks the device's conditions (power, network) during the download. To accomplish this, in some examples, the file 900 (in FIG. 8) may be split 910 into pieces 920, 930, 940, and 950 which are sent individually 952, 954, 956, and 958 The client 960 checks the conditions after every piece is received and then continues (or not) the download at its discretion. The constituent pieces of each file are reassembled at the client as they arrive, or, alternatively, when the final piece is downloaded. Should conditions deteriorate and force the client to suspend downloading, the download will resume from the suspended point (as opposed to from the beginning of the file) when conditions are suitable.

The protocol also allows for the client to continue downloading for some limited period of time even if conditions have deteriorated.

Initiating Sync'ing

The protocol allows for a sync (we sometimes refer to a sync'ing procedure simply as a sync) to be initiated in several ways.

One way is to use a timer on the client; when the timer expires, the client queries the server for the presence of new files. In the sample algorithm set forth below, the proposed counter starts at 300 seconds. To perform the count down, the client application must be always running on the device. This is much like a standard mobile application (e.g., a game), which is either active or closed, and when closed, does not consume any random-access memory on the device. In these implementation, the client application must be auto-started when the device is booted, and it must persist while the device is on. This is analogous to a home DVR, which is always on.

A second way to initiate a sync is in response to a user request. The client application may provide a "Sync Now" button or link. (FIG. 5) If user selects it, the application may:

(1) Attempt to perform an immediate sync, regardless of the conditions.

(2) Evaluate the 'downloadAllFiles' variable in the below algorithm, based on current conditions. If the variable evaluates to 'true', then the sync is performed. If not, the cause for failure may be presented to the user with a prompt, e.g., "The battery is only ⅓ full. Sync'ing may drain the battery further and risk draining it altogether. Do you wish to sync anyway?"

A third way to initiate a sync is from the server. In some settings, the client may be capable of receiving asynchronous messages directly from the server. For example, a RIM Blackberry device provisioned to use a Blackberry Enterprise Server (BES) can receive signals directly from the server through an MDS component. Therefore, the client application need not continuously poll the server for new files, nor remain active. The application can, instead, be inactive until the server signal arrives and causes the device to launch the application.

Algorithm

The features described above (and other features in various combinations) can be implemented in a wide variety of algorithms. Among other things, different algorithms may specify different techniques for suspending (and subsequently resuming) file downloads as conditions change. We provide one example of an algorithm below. We first introduce several terms and parameters that are relevant to the example.

Urgency Levels a. Urgent: File marked as time-sensitive and should be delivered as soon as possible.

b. Regular: File is not time-sensitive.

Battery Consumption Levels a. Charging: device is plugged into A/C power.

b. High: Running off battery, which is at least ⅞ charged.

c. Medium: Running off battery, which is between ½ and ⅞ charged.

d. Low: Running off battery, which is less than ½ charged.

Network Connectivity Levels a. Fast: Using WLAN.

b. Strong: using radio-access network; strong signal.

c. Medium: using radio-access network; medium signal.

d. Weak: using radio-access network; poor signal.

e. None: no network connectivity.

The example algorithm follows:

```
// When idle, wait this much time (in seconds) between probes for new content
#define TIME_BETWEEN_CHECKS_FOR_NEW_CONTENT 300
// While downloading, wait this much time (in seconds) between checking on the vital signs (battery, network)
#define TIME_BETWEEN_PROBES_OF_VITALS 120
// If conditions degrade during a download session, stop after this many seconds
#define MAX_TIME_IN_DEGRADED_STATE 120
last_check = getTime( );
do forever {
   // check to see if server has any new files to download
   If (getTime( ) – last_check > TIME_BETWEEN_CHECKS_FOR_NEW_CONTENT) {
         File_list = check_for_files( );
         last_check = getTime( );
   }
   If (File_list is empty) continue;      // Nothing to download
   If (network == "none") continue;       // No network access - can't do anything
   Boolean downloadAllFiles =
         (battery=="charging") ||                                    // device is on AC power
         ((battery=="high") && (network >= "strong")) ||   // device nearly charged and connection is strong
         ((battery=="medium") && (network =="fast"));       // device only half-charged but with high-speed
connection
// lower the bar somewhat for just downloading urgent files
Boolean downloadUrgentFiles =
      (downloadAllFiles==false) &&
      (battery=="medium" && network >="medium");      // device half-charged, network connection is so-so
if (downloadAllFiles)
      downloadFiles( );
else if (downloadUrgentFiles)
      downloadUrgentFiles( );
}
method downloadFiles( ) {
   beginBatteryState = getBatteryState( );
   beginNetworkState = getNetworkState( );
   int timeSpentInDegradedState = 0;
   for (file in File_list) {
         while (not done) {
         // download another chunk of this file
            int startTime = getTime( );
            download_from_file(file);
            int timeForThisChunk = getNow( ) – startTime;
            // Check our vitals. If nothing has changed, then carry on.
            If (getNetworkState( ) == beginNetworkState && getBatteryState( ) == beginBatteryState) {
               continue;
            }
            // Warning - vital signs are worse than when we began this download session
            // Increment the amount of time we've spent in this degraded state
            timeSpentInDegradedNetworkState += timeForThisChunk;
            // Have we reached time limit on downloading in degraded state?
            if (timeSpentInDegradedNetworkState > MAX_TIME_IN_DEGRADED_STATE) return;
         }
         // if we made it here, we downloaded 'file'. Now onto the next file...
   }
}
method downloadUrgentFiles( ) {
   // not shown explicitly; slight variation from downloadFiles( ) method, shown above
}
method download_from_file(File) {
   // continue downloading from 'File'. Stop downloading after 'TIME_BETWEEN_PROBES_OF_VITALS'
seconds
}
```

Additional Condition: Time of Day

Voice and SMS traffic generate more revenue per bit to the owner of a mobile network than generic data traffic. Therefore, during daytime hours (e.g., 9 AM-7 PM), when voice and SMS traffic is high and spare capacity limited, network owners are likely to discourage network-intensive applications. On the other hand, most cellular networks are 'latent' during off-peak hours such as 9 PM-6 AM. During this time window, mobile network owners are likely to be more receptive to network-intensive applications.

In short, bandwidth on a wireless radio-access network (e.g., EDGE or EVDO) is a commodity whose value to the network owner varies over time.

The application can accommodate this constraint by disabling sync activity altogether during daytime hours when sync'ing requires mobile network access. The result is that users may only receive updates during the evening hours.

Alternatively, the application can throttle its mobile network bandwidth usage to an acceptable level during the daytime hours by waiting a specified period of time between downloading chunks of data. For example, the application can cut by 50% its bandwidth usage by pausing for 'timeForThisChunk' seconds after the chunk (e.g., a piece of a file) has been downloaded. Similarly, the application can cut by 67% its bandwidth usage by pausing for twice this amount of time.

A network operator can offer a tiered level of service to its customers, in which those customers who pay for a 'premium service' are permitted higher throughput for during-the-day downloads over the mobile network. The application used by premium customers would not be forced to pause (as long, or at all) between chunk downloads.

Other implementations are also within the scope of the following claims.

The invention claimed is:

1. A method comprising:
   downloading a file over a communication channel from a server to a mobile device,
   monitoring, in the course of the download, a first condition comprising a capacity of the communication channel,
   monitoring, in the course of the download, a second condition comprising a state of resources at the mobile device that will be needed for the download,
   monitoring, in the course of the download, a third condition comprising an urgency of the file,
   continuing a partial download of the file, even when one or more of the conditions has deteriorated, if predetermined circumstances exist,
   suspending a download of the file that is occurring when a power level or network connectivity degrades during the download, and
   resuming the suspended download when the power level or network connectivity improves during the suspension.

2. The method of claim 1 in which the suspending of the download is based on a set of rules or heuristics.

3. The method of claim 1 in which the resumed download does not include at least some of the file that was downloaded before the suspension.

4. The method of claim 3 in which the resumed download does not include one or more pieces of the file that were downloaded before the suspension.

5. The method of claim 1 in which the conditions are monitored after each piece of the file is sent and before download of a subsequent piece has begun.

6. The method of claim 1 comprising
   enabling a user of the mobile device, to which large files are normally downloaded automatically from a server based on the user's preferences, to initiate a download by invoking a 'sync now' option on a user interface of the mobile device.

7. The method of claim 1 comprising
   at the mobile device, receiving a sync signal from the server with respect to one or more large files to be downloaded, and
   responding to the sync signal by requesting and accepting a download of the one or more large files.

8. The method of claim 1 comprising
   at the mobile device, displaying to a user an indication of the time when a download of one or more large files to the mobile device is expected to occur.

9. The method of claim 1 comprising
   adjusting a level of usage of the communication channel to download one or more large files to the mobile device based on a time of day when the download is to occur.

10. The method of claim 9 in which the level of usage at a given time of the day is governed by an amount paid by a user of the mobile device.

11. The method of claim 1 comprising
    sending from the mobile device to the server, a log of download activity with respect to one or more large files that are downloaded to the mobile device.

12. The method of claim 1 comprising
    enabling a user of the mobile device to specify one or more types of files that are to be downloaded to the mobile device, and storing the specification of file types in a server in association with an identification of the mobile device or the user.

13. The method of claim 1 comprising downloading files at the mobile device that have been selected based on stored preferences of a user of the mobile device and stored information about files that were previously downloaded to the user's device.

14. The method of claim 1 comprising
    displaying to a user of the mobile device a list of files that are in process of being downloaded to the device from the server, but which have not yet been completely downloaded to the device.

15. The method of 14 in which the displaying includes showing a percentage of at least one of the listed files which has been downloaded.

16. The method of 14 in which the displaying occurs at the mobile device.

17. The method of 14 in which the displaying occurs on a web page.

* * * * *

UNITED STATES PATENT AND TRADEMARK OFFICE
CERTIFICATE OF CORRECTION

| | | |
|---|---|---|
| PATENT NO. | : 8,027,671 B2 | Page 1 of 1 |
| APPLICATION NO. | : 12/013567 | |
| DATED | : September 27, 2011 | |
| INVENTOR(S) | : Gary N. Wallace, Jr. | |

It is certified that error appears in the above-identified patent and that said Letters Patent is hereby corrected as shown below:

Column 10, Line 37, In Claim 15, delete "of" and insert -- of claim --, therefor.

Column 10, Line 40, In Claim 16, delete "of" and insert -- of claim --, therefor.

Column 10, Line 42, In Claim 17, delete "of" and insert -- of claim --, therefor.

Signed and Sealed this
Twenty-ninth Day of November, 2011

David J. Kappos
*Director of the United States Patent and Trademark Office*